(12) United States Patent
Robinson

(10) Patent No.: US 7,914,014 B1
(45) Date of Patent: Mar. 29, 2011

(54) SCOOTER FOOTBELT

(76) Inventor: Floyd Henry Robinson, Klamath Falls, OR (US)

(*) Notice: Subject to any disclaimer, the term of this patent is extended or adjusted under 35 U.S.C. 154(b) by 21 days.

(21) Appl. No.: 12/566,499

(22) Filed: Sep. 24, 2009

(51) Int. Cl.
*B62B 9/12* (2006.01)
*B68B 5/06* (2006.01)
*A44B 11/25* (2006.01)

(52) U.S. Cl. ............. 280/14.23; 280/14.22; 24/164; 24/302

(58) Field of Classification Search ........... 280/14.21, 280/14.22, 14.23, 87.041; 296/75; 36/50.1, 36/50.5, 7.5, 11.5; 223/113, 114, 117; 24/164, 24/302, 614, 615, 182, 197; 224/673, 917
See application file for complete search history.

(56) References Cited

U.S. PATENT DOCUMENTS

| | | | | |
|---|---|---|---|---|
| 1,605,792 A * | 11/1926 | Simmons | ............ | 482/131 |
| 1,767,554 A * | 6/1930 | Rose | ............ | 182/4 |
| 1,834,258 A * | 12/1931 | Silen | ............ | 280/11.207 |
| 2,502,367 A * | 3/1950 | Burnes et al. | ............ | 280/226.1 |
| 2,855,198 A * | 10/1958 | King | ............ | 482/91 |
| 4,137,995 A * | 2/1979 | Fonte | ............ | 182/135 |
| 4,221,394 A * | 9/1980 | Campbell | ............ | 280/14.25 |
| 4,243,265 A * | 1/1981 | Hanik | ............ | 297/423.1 |
| 4,609,188 A * | 9/1986 | Lind | ............ | 482/140 |
| 4,761,013 A * | 8/1988 | Dowton | ............ | 280/87.021 |
| 4,790,462 A * | 12/1988 | Kawaguchi | ............ | 224/250 |
| 4,915,400 A * | 4/1990 | Chambers | ............ | 280/14.27 |
| 5,046,721 A * | 9/1991 | Altare | ............ | 482/17 |
| 5,080,382 A * | 1/1992 | Franz | ............ | 280/87.042 |
| 5,125,859 A | 6/1992 | Spurgeon | | |
| 5,401,045 A * | 3/1995 | Foerster et al. | ............ | 280/250.1 |
| 5,458,859 A | 10/1995 | Vollhardt | | |
| 5,544,919 A | 8/1996 | Tinkler | | |
| 5,609,347 A * | 3/1997 | Dressel | ............ | 280/14.23 |
| 5,846,108 A * | 12/1998 | Milford | ............ | 441/67 |
| 5,997,018 A | 12/1999 | Lee | | |
| 6,036,202 A * | 3/2000 | LaCome | ............ | 280/28.14 |
| 6,145,721 A * | 11/2000 | Gately | ............ | 224/680 |
| 6,290,260 B1 * | 9/2001 | Brill | ............ | 280/809 |
| 6,368,173 B1 | 4/2002 | Runyan | | |
| 6,371,346 B1 * | 4/2002 | Sharma | ............ | 224/578 |
| D473,906 S | 4/2003 | Schmid | | |
| 6,648,843 B1 * | 11/2003 | Marciano et al. | ............ | 602/27 |
| 6,775,927 B2 * | 8/2004 | Glicksman | ............ | 36/36 R |
| 6,884,136 B1 * | 4/2005 | McCarthy | ............ | 441/64 |
| 6,955,616 B1 * | 10/2005 | Barth et al. | ............ | 473/452 |
| D530,385 S | 10/2006 | Ghassedi | | |
| 7,121,572 B1 * | 10/2006 | Jaffe et al. | ............ | 280/304.1 |
| 7,614,639 B2 * | 11/2009 | Tholkes et al. | ............ | 280/638 |
| 2004/0017052 A1 * | 1/2004 | Takahashi | ............ | 280/14.28 |
| 2005/0280231 A1 | 12/2005 | Gallipoli | | |
| 2009/0134602 A1 * | 5/2009 | Pontano et al. | ............ | 280/618 |
| 2009/0286661 A1 * | 11/2009 | Campbell | ............ | 482/124 |

* cited by examiner

*Primary Examiner* — Joanne Silbermann
*Assistant Examiner* — Daniel Yeagley
(74) *Attorney, Agent, or Firm* — Jerry Haynes Law

(57) ABSTRACT

A scooter footbelt includes a footbelt strap, a right foot receptacle and a left foot receptacle carried by the footbelt strap and a strap fastener carried by the footbelt strap.

12 Claims, 2 Drawing Sheets ic # SCOOTER FOOTBELT

FIELD OF THE INVENTION

The present disclosure generally relates to scooters. More particularly, the present disclosure relates to a scooter footbelt which is adapted to secure the feet of a scooter rider during operation of the scooter.

BACKGROUND OF THE INVENTION

Scooters are two-wheeled or three-wheeled vehicles which include a wheeled frame or chassis having a seat and a steering column fitted with handlebars. One of the wheels may be drivingly engaged by a gasoline or electric motor. A foot platform is typically provided on the scooter chassis behind the steering column and in front of the seat to support the feet of the driver during operation of the scooter.

During operation of the scooter, a rider typically sits on the seat with his or her feet resting on the foot platform. In the event that the scooter traverses bumps and dips in the surface on which the scooter is operated, however, the rider's feet may have a tendency to slip off the foot platform. This may cause the rider of the scooter to inadvertently fall from the scooter during operation.

Therefore, a scooter footbelt which is adapted to secure the feet of a scooter rider during operation of the scooter is needed.

SUMMARY OF THE INVENTION

The present disclosure is generally directed to a scooter footbelt which is adapted to secure the feet of a scooter rider during operation of a scooter. An illustrative embodiment of the scooter footbelt includes a footbelt strap, a right foot receptacle and a left foot receptacle carried by the footbelt strap and a strap fastener carried by the footbelt strap.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention which is defined by the claims. Furthermore, there is no intention to be bound by any expressed or implied theory presented in the preceding technical field, background, brief summary or the following detailed description.

Figure 4:
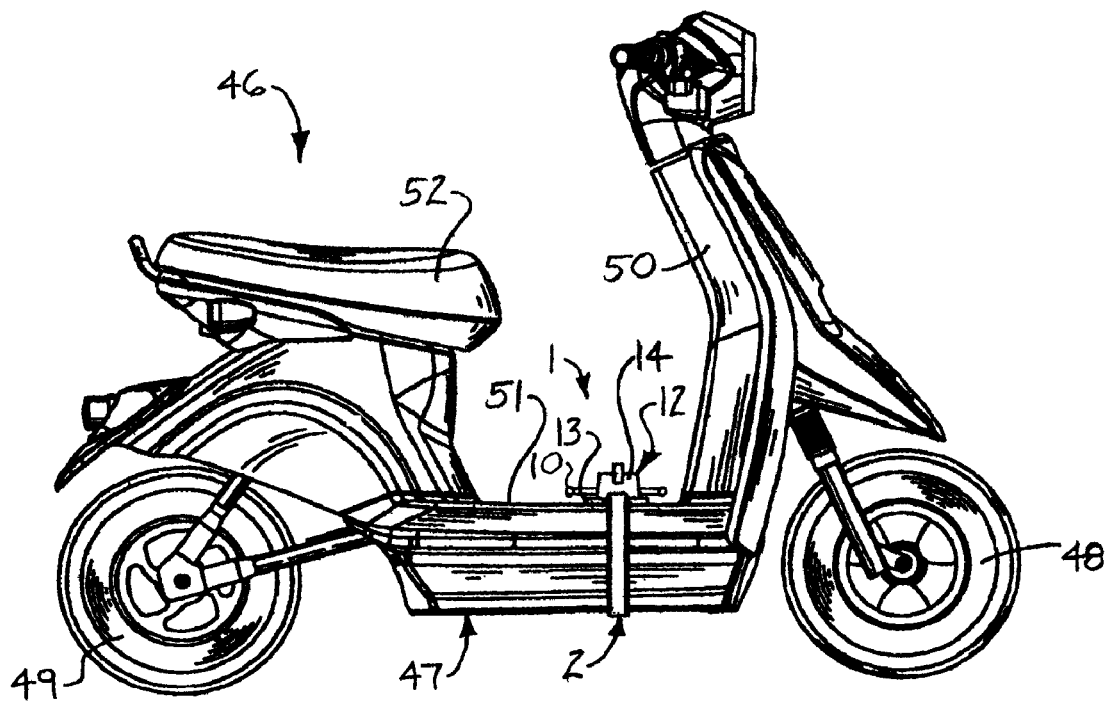
FIG. 4 is a side view of a scooter, with an illustrative embodiment of the scooter footbelt provided on the scooter.
Figure 5:
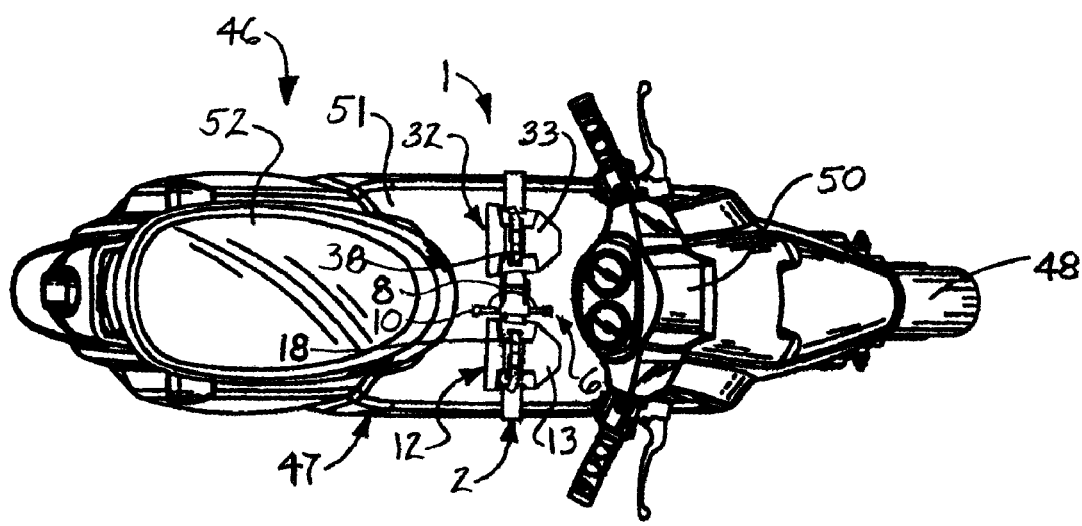
FIG. 5 is a top view of the scooter, with an illustrative embodiment of the scooter footbelt provided on the scooter.

Referring to the drawings, an illustrative embodiment of the scooter footbelt is generally indicated by reference numeral 1. As illustrated in FIGS. 4 and 5 and will be hereinafter further described, the scooter footbelt 1 is suitable for attachment to a scooter chassis 47 of a scooter 46 typically between a steering column 50 and a seat 52 on the scooter 46. The scooter 46 may have a front wheel 48 which is engaged by the steering column 50 for steering purposes and a rear wheel 49 which may be drivingly engaged by a gas or electric motor (not illustrated). The scooter footbelt 1 is adapted to secure the feet (not illustrated) of a rider (not illustrated) on the scooter 46 to a foot platform 51 provided on the scooter chassis 47 during operation of the scooter 46. Accordingly, in the event that the scooter 46 traverses bumps (not illustrated), dips (not illustrated) or other irregularities in a surface over which the scooter 46 travels, the scooter footbelt 1 may prevent the rider from inadvertently falling from the scooter 46.

Figure 1:
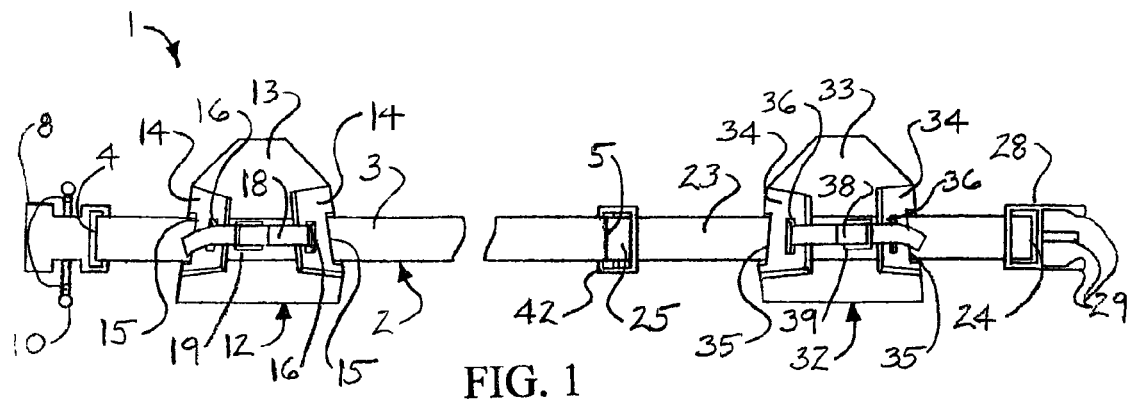
FIG. 1 is a top view, partially in section, of an illustrative embodiment of the scooter footbelt.
Figure 2:
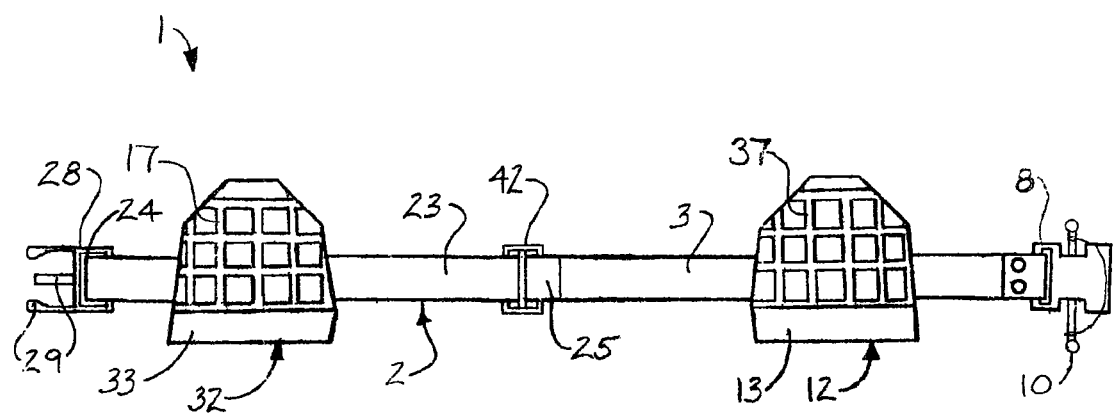
FIG. 2 is a bottom view, partially in section, of an illustrative embodiment of the scooter footbelt.
Figure 3:
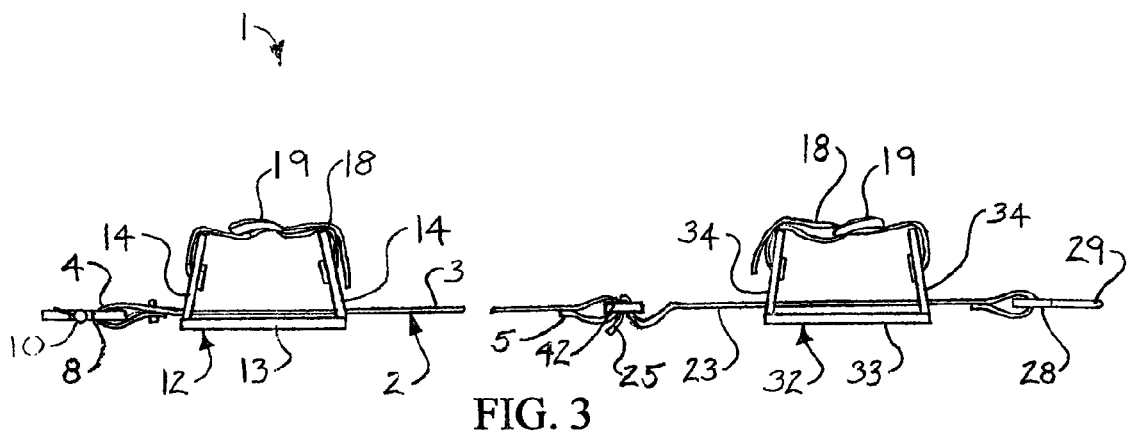
FIG. 3 is a front view, partially in section, of an illustrative embodiment of the scooter footbelt.

As illustrated in FIGS. 1-3, the scooter footbelt 1 may include a generally elongated, flexible footbelt strap 2 which may be nylon or other tear-resistant and durable material. In some embodiments, the footbelt strap 2 may include a right strap segment 3 and a left strap segment 23 which may be attached to the right strap segment 3 via a footbelt strap adjuster 42. The footbelt strap adjuster 42 may facilitate selective adjustment in the length of the footbelt strap 2 typically in the conventional manner.

The right strap segment 3 of the footbelt strap 2 may have a strap fastening end 4 and a strap adjusting end 5 which is opposite the strap fastening end 4. A strap fastener 6 (FIG. 5) may be provided on the footbelt strap 2. In some embodiments, the strap fastener 6 may include a female buckle element 8 provided on the strap fastening end 4 of the footbelt strap 2 and a male buckle element 28 which is provided on the left strap segment 23 according to the knowledge of those skilled in the art and is adapted for removable insertion in the female buckle element 28. In some embodiments, the female buckle element 8 and the male buckle element 28 of the strap fastener 6 may be metal. A safety lock pin 10 may extend through registering pin openings (not illustrated) provided in the female buckle element 8 and the male buckle element 28, respectively, to reinforce the male buckle element 28 in the female buckle element 8. The strap adjusting end 5 of the footbelt strap 2 may be attached to or threaded through the footbelt strap adjuster 42.

A right foot receptacle 12 is provided on the right strap segment 3 of the footbelt strap 2. The right foot receptacle 12 may be rubber, plastic or other flexible or semi-flexible material and may be fabricated in various sizes to accommodate to accommodate various foot sizes. In some embodiments, the right foot receptacle 12 may include a receptacle base 13. As illustrated in FIG. 2, in some embodiments a texture pattern 17 may be provided on a bottom surface of the receptacle base 13 to impart friction between the receptacle base 13 and the foot platform 51 (FIGS. 4 and 5) of the scooter 46 when the scooter footbelt 1 is fastened to the scooter 46. A pair of spaced-apart receptacle side panels 14 may extend from the receptacle base 13. A pair of registering footbelt strap slots 15 may be provided in the respective receptacle side panels 14. The right strap segment 3 of the footbelt strap 2 may extend through the footbelt strap slots 15. Accordingly, the right foot receptacle 12 may be placed at a selected position on the right strap segment 3 by sliding the right foot receptacle 12 along the right strap segment 3.

A foot strap 18 may be provided on the receptacle side panels 14 of the right foot receptacle 12. In some embodiments, the foot strap 18 may extend through a pair of foot strap slots 16 provided in the respective receptacle side panels 14. A foot strap adjuster 19 may be provided on the foot strap 18 to render the foot strap 18 length-adjustable as is known by those skilled in the art.

The left strap segment 23 of the footbelt strap 2 may have a strap fastening end 24 and a strap adjusting end 25 which is opposite the strap fastening end 24. The male buckle element 28 of the strap fastener 6 (FIG. 5) may be provided on the strap fastening end 24 according to the knowledge of those skilled in the art. The male buckle element 28 may include multiple buckle prongs 29 which are adapted for removable insertion into the female buckle element 8 provided on the right strap segment 3. The strap adjusting end 25 of the left strap segment 23 may be attached to or threaded through the footbelt strap adjuster 42.

A left foot receptacle 32 is provided on the left strap segment 23 of the footbelt strap 2. The left foot receptacle 32 may be rubber, plastic or other flexible or semi-flexible material and may be fabricated in various sizes to accommodate to accommodate various foot sizes. In some embodiments, the left foot receptacle 32 may be similar in design to the right foot receptacle 12, including a receptacle base 33; a pair of spaced-apart receptacle side panels 34 which extend from the receptacle base 33; and a pair of registering footbelt strap slots 35 provided in the respective receptacle side panels 34. Accordingly, the left foot receptacle 32 may be placed at a selected position on the left strap segment 23 by sliding the left foot receptacle 32 along the left strap segment 23. A texture pattern 37 (FIG. 2) may be provided on a bottom surface of the receptacle base 33 to impart friction between the receptacle base 33 and the foot platform 51 (FIGS. 4 and 5) of the scooter 46 and prevent inadvertent movement between the foot platform 51 and the right foot receptacle 12 and the left foot receptacle 32 when the scooter footbelt 1 is fastened to the scooter 46. The left strap segment 23 of the footbelt strap 2 may extend through the footbelt strap slots 35.

A foot strap 38 may be provided on the receptacle side panels 34 of the left foot receptacle 32. In some embodiments, the foot strap 38 may extend through a pair of foot strap slots 36 provided in the respective receptacle side panels 34. A foot strap adjuster 39 may be provided on the foot strap 38 to render the foot strap 38 length-adjustable.

Referring next to FIGS. 4 and 5, in typical use the scooter footbelt 1 is fastened to the scooter chassis 47 of the scooter 46 between the steering column 50 and the seat 52. This may be accomplished by extending the footbelt strap 2 around the scooter chassis 47 and engaging the strap fastener 6 by inserting the buckle prongs 29 of the male buckle element 28 into the female buckle element 8. The safety lock pin 10 may be extended through registering pin openings (not illustrated) provided in the female buckle element 8 and the male buckle element 28, respectively, to reinforce the male buckle element 28 in the female buckle element 8. As illustrated in FIG. 5, the right foot receptacle 12 and the left foot receptacle 32 are positioned on the right and left portions, respectively, of the foot platform 51 of the scooter chassis 47. The distance between the right foot receptacle 12 and the left foot receptacle 32 can be adjusted by sliding the right foot receptacle 12 along the right strap segment 3 and the left foot receptacle 32 along the left strap segment 23. The footbelt strap 2 may be selectively shortened to tighten the footbelt strap 2 around the scooter chassis 47 using the footbelt strap adjuster 42.

In operation of the scooter 46, an operator (not illustrated) sits on the seat 52 of the scooter 46 and places his or her right and left feet in the right foot receptacle 12 and the left foot receptacle 32, respectively, of the scooter footbelt 1. The foot strap 18 of the right foot receptacle 12 may be tightened using the foot strap adjuster 19, and the foot strap 38 of the left foot receptacle 32 may be tightened using the foot strap adjuster 39, as needed to achieve a secure fit of the operator's right foot in the right foot receptacle 12 and the operator's left foot in the left foot receptacle 32. In the event that the scooter 46 traverses bumps and dips in a surface (not illustrated) on which the scooter 46 is operated, the right foot receptacle 12 and the left foot receptacle 32 secure the operator's right and left feet to the foot platform 51 of the scooter chassis 47 and prevent the operator from inadvertently falling from the scooter 46. When use of the scooter footbelt 1 is not desired, the footbelt strap 2 may be unfastened and removed from the scooter chassis 47 by removing the buckle prongs 29 of the male buckle element 28 from the female buckle element 8.

While various illustrative embodiments have been described above, it will be recognized and understood that various modifications can be made and the appended claims are intended to cover all such modifications which may fall within the spirit and scope of the disclosure.

What is claimed is:

1. A scooter footbelt, comprising:
   a footbelt strap;
   a right foot receptacle and a left foot receptacle carried by the footbelt strap and each comprising:
      a receptacle base;
      a pair of spaced-apart receptacle side panels carried by the receptacle base; and
      a pair of footbelt strap slots provided in the receptacle side panels, respectively, and wherein the footbelt strap extends through the footbelt strap slots; and
   a strap fastener carried by the footbelt strap.

2. The scooter footbelt of claim 1 wherein the right foot receptacle and the left foot receptacle are selectively positional along the footbelt strap.

3. The scooter footbelt of claim 1 wherein the footbelt strap comprises nylon.

4. The scooter footbelt of claim 1 wherein the footbelt strap comprises a right strap segment and a left strap segment extending from the right strap segment, and wherein the right foot receptacle is carried by the right strap segment and the left foot receptacle is carried by the left strap segment.

5. The scooter footbelt of claim 4 further comprising a footbelt strap adjuster connecting the right strap segment and the left strap segment.

6. The scooter footbelt of claim 4 wherein the strap adjuster comprises a female buckle element carried by a first one of the right strap segment and the left strap segment and a male buckle element carried by a second one of the right strap segment and the left strap segment and adapted for insertion in the female buckle element.

7. The scooter footbelt of claim 1 further comprising a texture pattern provided in the receptacle base.

8. A scooter footbelt, comprising:
   a footbelt strap comprising
      a right strap segment having a strap fastening end and a strap adjusting end;
      a left strap segment having a strap fastening end and a strap adjusting end;
      a footbelt strap adjuster connecting the strap adjusting end of the right strap segment and the strap adjusting end of the left strap segment; and
   a strap fastener comprising:
      a first one of a male buckle element and a female buckle element carried by a first one of the strap fastening end of the right strap segment and the strap fastening end of the left strap segment; and a second one of a male buckle element and a female buckle element carried by a second one of the strap fastening end of the right strap segment and the strap fastening end of the left strap segment; and a right foot receptacle and a left foot receptacle carried by the footbelt strap and each comprising:

a receptacle base;

a pair of spaced-apart receptacle side panels carried by the receptacle base;

a pair of footbelt strap slots provided in the receptacle side panels, respectively, and wherein the footbelt strap extends through the footbelt strap slots; and a foot strap extending between the receptacle side panels.

9. The scooter footbelt of claim 8 further comprising a foot strap adjuster provided on the foot strap.

10. The scooter footbelt of claim 8 wherein the footbelt strap comprises nylon.

11. The scooter footbelt of claim 8 wherein each of the right foot receptacle and the left foot receptacle comprises rubber.

12. The scooter footbelt of claim 8 further comprising a texture pattern provided in the receptacle base.

* * * * *